M. RUNSTETLER.

Assignor to the FARMER'S FRIEND MANUFACTURING COMPANY.

CORN PLANTER.

No. 10,156. Reissued July 11, 1882.

Attest

Jno. E. Jones

Jno. E. Wiles

Inventor

Andrew Runstetler, by Wood & Boyd his Attorneys &c.

N. PETERS, Photo-Lithographer, Washington, D. C.

UNITED STATES PATENT OFFICE.

ANDREW RUNSTETLER, OF DAYTON, OHIO, ASSIGNOR TO THE FARMERS FRIEND MANUFACTURING COMPANY, OF SAME PLACE.

CORN-PLANTER.

SPECIFICATION forming part of Reissued Letters Patent No. 10,156, dated July 11, 1882.

Original No. 228,396, dated June 1, 1880. Application for reissue filed May 15, 1882.

*To all whom it may concern:*

Be it known that I, ANDREW RUNSTETLER, a citizen of the United States, residing at Dayton, in the county of Montgomery and State of Ohio, have invented certain new and useful Improvements in Corn-Planters, of which the following is a specification.

My invention relates to an improvement in corn-planters of the class employing a main frame mounted on wheels having a seat for the driver, and which main frame is combined with a forward frame mounted on runners carrying seeding devices for dropping the seed through the heel of the runners.

My invention consists in providing a locking device attached to the seat-standard and engaging with notches on the elevating and depressing lever, so that the runner-frame may be locked to hold it in any desired position, either in or out of the ground.

My invention also consists in combining with the segmental lock-plate upon the foot-lever a lock-lever for holding the seeding-frame in any given position, constituting a rigid corn-planter.

Figure 1:
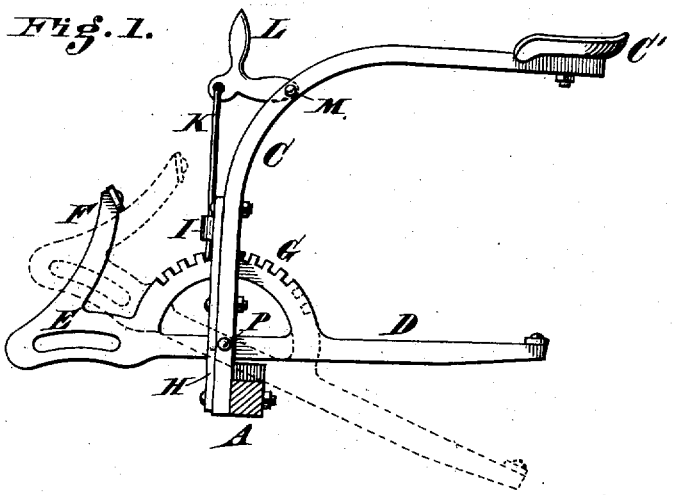
Figure 2:
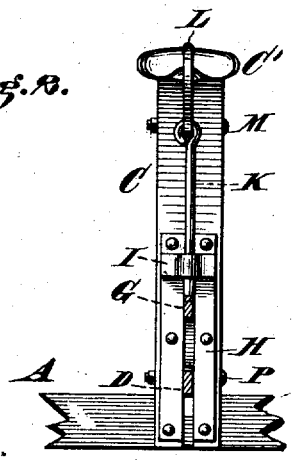

In the drawings, Figure 1 is a side elevation, showing my invention; Fig. 2, a front elevation of the same.

A represents the axle of the main frame.

C represents a curved seat-standard.

D represents the foot-lever, which is preferably pivoted in a slot cut in the foot of the seat-standard.

E represents a slot in the forward part of the lever, through which a pivot-bolt on the rear end of the runner-frame passes.

F represents a foot-piece, which projects up from lever D sufficiently to be in easy reach of the driver's foot.

G represents a segmental notch-plate.

Seat-standard C is slotted upward sufficiently to allow it to turn with the lever D on pivot P.

H represents a metal plate on the front of standard C.

I represents a bearing for lock-lever K.

L represents a crank-lever, one end of which is pivoted to standard C, and to the other end the hook-bar K is hinged.

Crank-lever L is operated by the hand of the attendant to release and engage lock K with segmental notches G. The attendant with his feet raises or lowers the runner-frame, and with his hand secures or releases lock K.

The crank-lever L is placed vertically above the segment, and, being operated by a crank, avoids the use of a spring to set or release the lock.

A spring lock-lever might be used with a segment having holes, instead of the device here shown, without affecting the invention.

By means of this locking device the runner-frame can be rigidly set in any desired position, and the weight of the front frame partly transmitted to and sustained by the ground-wheels.

Corn-planters have been provided with an adjustable driver's seat, and with a fixed notched segment and a lever connected by intermediate devices with the front runners of the machine, whereby said runners could be raised or lowered by moving the lever rearwardly or forwardly, the said lever carrying a pawl engaging the notched segment for the purpose of locking it in its adjusted position. Such broadly is not my invention.

I claim—

1. The foot-treadle D, pivotally attached to the main frame, in combination with a locking device on said treadle, and frame for holding the treadle in any fixed position, substantially as herein set forth.

2. The combination, with the standard C and elevating and depressing lever pivoted thereto, of a locking device attached to the seat-standard for holding the runner-frame in any desired fixed position, substantially as herein set forth.

3. The combination, with the main frame, the elevating and depressing foot-lever D, carrying the segmental notched plate G, and provided with the slot E and foot-piece F, of the lock-bar K, mounted upon said standard and provided with a suitable operating device or devices, substantially as described.

In witness whereof I have hereto set my hand this 12th day of April, 1882.

ANDREW RUNSTETLER.

Witnesses:

GEORGE O. WARRINGTON,
JAMES A. MARLAY.